United States Patent
Kobayashi et al.

(10) Patent No.: US 9,244,773 B2
(45) Date of Patent: Jan. 26, 2016

(54) APPARATUS AND METHOD FOR HANDLING ABNORMALITIES OCCURRING DURING STARTUP

(71) Applicant: FUJITSU LIMITED, Kawasaki-shi, Kanagawa (JP)

(72) Inventors: Hidefumi Kobayashi, Yokohama (JP); Tatsuya Yanagisawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 206 days.

(21) Appl. No.: 14/034,068

(22) Filed: Sep. 23, 2013

(65) Prior Publication Data

US 2014/0095921 A1  Apr. 3, 2014

(30) Foreign Application Priority Data

Sep. 28, 2012  (JP) .................................. 2012-217241

(51) Int. Cl.
*G06F 11/00* (2006.01)
*G06F 11/14* (2006.01)
*G06F 11/20* (2006.01)
*G06F 11/07* (2006.01)

(52) U.S. Cl.
CPC ........ *G06F 11/1417* (2013.01); *G06F 11/1441* (2013.01); *G06F 11/0727* (2013.01); *G06F 11/0775* (2013.01); *G06F 11/0781* (2013.01); *G06F 11/1428* (2013.01); *G06F 11/2007* (2013.01); *G06F 11/2089* (2013.01)

(58) Field of Classification Search
CPC ............ G06F 11/1417; G06F 11/1438; G06F 11/1441
See application file for complete search history.

(56) References Cited

U.S. PATENT DOCUMENTS

| 5,729,552 A | 3/1998 | Yorimitsu |
| 6,651,182 B1 * | 11/2003 | Chang et al. ....................... 714/3 |
| 6,691,225 B1 * | 2/2004 | Suffin ................. 713/2 |
| 7,266,727 B2 * | 9/2007 | Crowell et al. ................. 714/36 |
| 7,415,634 B2 * | 8/2008 | Anderson et al. ............... 714/36 |
| 7,747,893 B2 * | 6/2010 | Bailey et al. ....................... 714/2 |
| 2007/0250723 A1 | 10/2007 | Shima |
| 2012/0185686 A1 * | 7/2012 | Kren et al. ......................... 713/2 |

FOREIGN PATENT DOCUMENTS

| JP | 5-166287 | 7/1993 |
| JP | 9-198325 | 7/1997 |
| JP | 2002-6996 | 1/2002 |
| JP | 2007-293448 | 11/2007 |

* cited by examiner

*Primary Examiner* — Joseph Kudirka
(74) *Attorney, Agent, or Firm* — Staas & Halsey LLP

(57) ABSTRACT

An information processing apparatus that performs a startup control of redundantly configured modules includes a memory to retain abnormality information regarding an abnormality that occurs at time of startup control of the modules, and a startup controller section executing a startup process by sequentially executing the process, generating the abnormality information, determining whether a reduced operation is possible or not when the module in which an abnormality occurs at the time of startup control is detected, completing an execution of the process block in progress when it is determined that the reduced operation is possible, executing a restart process on a module selected from all the modules in which abnormalities occur at the time of startup control based on the abnormality information and completing an execution of the process block in progress after completing the restart process when determined that the reduced operation is not possible.

10 Claims, 17 Drawing Sheets

FIG. 5

| CA | CONNECTION DESTINATION |
|---|---|
| CA#00 | SERVER #1 |
| CA#01 | SERVER #2 |
| CA#10 | SERVER #1 |
| CA#11 | SERVER #2 |
| CA#02 | NONE |
| CA#03 | NONE |
| CA#12 | NONE |
| CA#13 | NONE |

FIG. 6

| SERVER GROUP | CA IN GROUP | |
|---|---|---|
| SERVER #1 | CA#00 | CA#10 |
| SERVER #2 | CA#01 | CA#11 |

FIG. 7

| PROCESS BLOCK | CM PROCESS NUMBER | CM EXECUTION PROCESS | CA PROCESS NUMBER | CA EXECUTION PROCESS |
|---|---|---|---|---|
| 01 | CM01 | CM HARDWARE SETTING | | |
| 02 | CM02 | FIRMWARE INFORMATION ACQUISITION | | |
| | | | CA01 | CA POWER ON |
| 03 | CM03 | FIRMWARE VALIDITY CHECK | | |
| | | | CA02 | CA RESET STATE RELEASE |
| 04 | CM04 | CM MEMORY DIAGNOSIS | | |
| | | | CA03 | CA HARDWARE SETTING |
| 05 | CM05 | DISK READY CHECK | | |
| | | | CA04 | ADAPTOR PROCESS START INSTRUCTION |
| 06 | CM06 | CONFIGURATION INFORMATION UPDATING PROCESS | | |
| 07 | | | CA05 | CONFIGURATION INFORMATION RECEPTION INSTRUCTION |
| 08 | | | CA06 | ONLINE INSTRUCTION |
| 09 | CM07 | DEVICE READY | | |

FIG. 8

| PROCESS BLOCK | CA PROCESS NUMBER | CA EXECUTION PROCESS |
|---|---|---|
| 01 | CAR01 | CA RESET |
| | CAR02 | CA POWER OFF AND CA POWER ON |
| | CAR03 | CA RESET STATE RELEASE |
| 02 | CAR04 | CA HARDWARE SETTING |
| 03 | CAR05 | ADAPTOR PROCESS START INSTRUCTION |
| 04 | CAR06 | CONFIGURATION INFORMATION RECEPTION INSTRUCTION |
| 05 | CAR07 | ONLINE INSTRUCTION |

FIG. 12

| LOCATION INFORMATION | | STATUS | CAUSE OF ERROR | SEVERITY | POSSIBILITY OF RECOVERY | POINT |
|---|---|---|---|---|---|---|
| CM#0 | CA#00 | DEGRADE | HARDWARE ERROR | MODERATE | RECOVERABLE | CA04 |
| CM#0 | CA#01 | DEGRADE | SOFTWARE ERROR | MILD | RECOVERABLE | CA04 |
| CM#1 | CA#10 | DEGRADE | FATAL HARDWARE ERROR | SEVERE | NON-RECOVERABLE | CA04 |

| PROCESS BLOCK | CM PROCESS NUMBER | CM EXECUTION PROCESS | CA PROCESS NUMBER | CA EXECUTION PROCESS |
|---|---|---|---|---|
| 01 | CM01 | CM HARDWARE SETTING | | |
| 02 | CM02 | FIRMWARE INFORMATION ACQUISITION | CA01 | CA POWER ON |
| 03 | CM03 | FIRMWARE VALIDITY CHECK | CA02 | CA RESET STATE RELEASE |
| 04 | CM04 | CM MEMORY DIAGNOSIS | CA03 | CA HARDWARE SETTING |
| 05 | CM05 | DISK READY CHECK | | |
| 06 | CM06 | CONFIGURATION INFORMATION UPDATING PROCESS | CA04 | ADAPTOR PROCESS START INSTRUCTION |
| 07 | | | CA05 | CONFIGURATION INFORMATION RECEPTION INSTRUCTION |
| 08 | | | CA06 | ONLINE INSTRUCTION |
| 09 | CM07 | DEVICE READY | | |

FIG. 14

| LOCATION INFORMATION | | STATUS | CAUSE OF ERROR | SEVERITY | POSSIBILITY OF RECOVERY | POINT |
|---|---|---|---|---|---|---|
| CM#0 | CA#00 | DEGRADE | HARDWARE ERROR | MODERATE | RECOVERABLE | CA04 |

| PROCESS BLOCK | CM PROCESS NUMBER | CM EXECUTION PROCESS | CA PROCESS NUMBER | CA EXECUTION PROCESS |
|---|---|---|---|---|
| 01 | CM01 | CM HARDWARE SETTING | | |
| 02 | CM02 | FIRMWARE INFORMATION ACQUISITION | CA01 | CA POWER ON |
| | CM03 | FIRMWARE VALIDITY CHECK | CA02 | CA RESET STATE RELEASE |
| 03 | CM04 | CM MEMORY DIAGNOSIS | CA03 | CA HARDWARE SETTING |
| 04 | CM05 | DISK READY CHECK | | |
| 05 | | | CA04 | ADAPTOR PROCESS START INSTRUCTION |
| 06 | CM06 | CONFIGURATION INFORMATION UPDATING PROCESS | | |
| 07 | | | CA05 | CONFIGURATION INFORMATION RECEPTION INSTRUCTION |
| 08 | | | CA06 | ONLINE INSTRUCTION |
| 09 | CM07 | DEVICE READY | | |

FIG. 16

| LOCATION INFORMATION | | STATUS | CAUSE OF ERROR | SEVERITY | POSSIBILITY OF RECOVERY | POINT |
|---|---|---|---|---|---|---|
| CM#1 | CA#10 | DEGRADE | HARDWARE ERROR | MODERATE | RECOVERABLE | CA02 |

| LOCATION INFORMATION | | STATUS | CAUSE OF ERROR | SEVERITY | POSSIBILITY OF RECOVERY | POINT |
|---|---|---|---|---|---|---|
| CM#1 | CA#10 | DEGRADE | HARDWARE ERROR | MODERATE | RECOVERABLE | CA02 |
| CM#0 | CA#00 | DEGRADE | FATAL HARDWARE ERROR | SEVERE | NON-RECOVERABLE | CA04 |

59

APPARATUS AND METHOD FOR HANDLING ABNORMALITIES OCCURRING DURING STARTUP

CROSS-REFERENCE TO RELATED APPLICATION

This application is based upon and claims the benefit of priority from the prior Japanese Patent Application No. 2012-217241 filed on Sep. 28, 2012, the entire contents of which are incorporated herein by reference.

FIELD

The embodiments discussed herein are related to an information processing apparatus, a startup program, and a startup method.

BACKGROUND

Some information processing apparatuses are designed in an attempt to provide highly reliable services by employing a redundant configuration for modules that perform parts of processes to provide the services. A startup control of such redundantly configured modules is carried out by an information processing apparatus that manages and controls the modules.

When an abnormality occurs in some of the modules, the information processing apparatus detaches the module in which the abnormality is detected or restarts the module in which the abnormality is detected in an attempt to carry out the startup control in a state where provision of services is secured.

Japanese Laid-open Patent Publication No. 2002-6996, Japanese Laid-open Patent Publication No. 5-166287, Japanese Laid-open Patent Publication No. 9-198325, and Japanese Laid-open Patent Publication No. 2007-293448 discuss technologies similar to the one described above.

However, when the information processing apparatus fails to startup in a state where provision of services is secured after detaching the module in which an abnormality is detected, a restart of the whole system becomes highly desirable. As a result, a startup time until the information processing apparatus is ready to provide services becomes longer.

Furthermore, the startup time until the information processing apparatus is ready to provide services may increase when a module is restarted every time an abnormality is detected.

In an information processing system where shut downs and start ups are repeated at regular intervals, such an increase of the startup time may lead to a delay of an operation following a certain time schedule.

According to one aspect, an object of the present disclosure is to provide an information processing apparatus, a startup program, and a startup method capable of controlling a delay time to startup one or more of redundantly configured modules when abnormalities are detected at the time of startup of the one or more of redundantly configured modules.

SUMMARY

According to an aspect of the embodiment, an information processing apparatus that performs a startup control of redundantly configured modules includes a memory to retain abnormality information regarding an abnormality that occurs at time of startup control of the modules and a startup controller section. The startup controller section executes a startup process by sequentially executing the process, generates the abnormality information, determines whether a reduced operation is possible or not when the module in which an abnormality occurs at the time of startup control is detected, completes an execution of the process block in progress when it is determined that the reduced operation is possible, executes a restart process on a module selected from all the modules in which abnormalities occur at the time of startup control based on the abnormality information and completes an execution of the process block in progress after completing the restart process when it is determined that the reduced operation is not possible.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of CA connection destination information according to the second embodiment;

FIG. 6 is a diagram illustrating an example of server group information according to the second embodiment;

FIG. 7 is a diagram illustrating an example of a power on sequence according to the second embodiment;

FIG. 8 is a diagram illustrating an example of a CA restart process according to the second embodiment;

FIG. 12 is a diagram illustrating an example of abnormality configuration information according to the second embodiment;

FIG. 13 is a diagram illustrating an abnormality detection example at one of redundantly configured channel adaptor modules during the power on sequence according to the second embodiment;

FIG. 14 is a diagram illustrating an example of abnormality configuration information at time of abnormality detection illustrated in FIG. 13;

FIG. 15 is a diagram illustrating an abnormality detection example for all the redundantly configured channel adaptor modules during the power on sequence according to the second embodiment;

FIG. 16 is a diagram illustrating an example of abnormality configuration information at time of abnormality detection illustrated in FIG. 15; and FIG. 17 is a diagram illustrating an example of abnormality configuration information at the time of abnormality detection illustrated in FIG. 15.

DESCRIPTION OF EMBODIMENTS

Hereinafter, embodiments are described in detail with reference to the drawings.

First Embodiment

Figure 1:
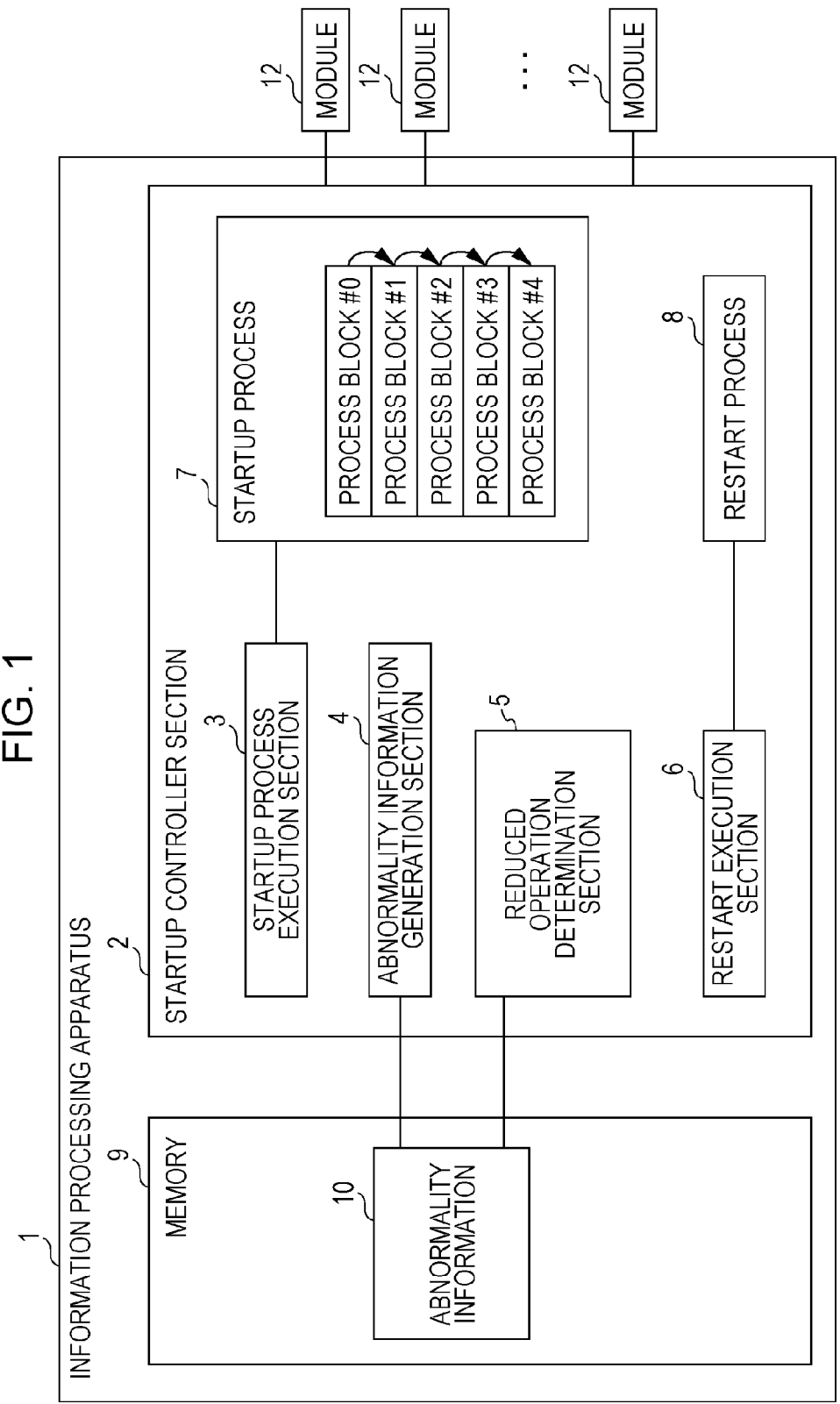
FIG. 1 is a diagram illustrating a configuration example of an information processing apparatus according to a first embodiment.

First, an information processing apparatus according to the first embodiment is described with reference to FIG. 1. FIG. 1 is a diagram illustrating a configuration example of the information processing apparatus according to the first embodiment.

An information processing apparatus 1 executes a startup process 7 at a predetermined startup event (for example, turning power on or resetting). The information processing apparatus 1 executes the startup process 7 in accordance with a startup program. The information processing apparatus 1 performs a startup control of its own as well as a startup control of a plurality of modules 12.

The information processing apparatus 1 is connected to the plurality of modules 12 internally or externally. The plurality of modules 12 includes the minimum number of units desirable to provide services with the information processing apparatus 1 and an additional number of units as a margin.

The information processing apparatus 1 includes a startup controller section 2 and a memory 9. The startup controller section 2 includes a startup process execution section 3, an abnormality information generation section 4, a reduced operation determination section 5, and a restart execution section 6.

The startup process execution section 3 executes the startup process 7. The startup process (startup program) 7 includes a plurality of process blocks (for example, process block #0, process block #1, ... process block #4). The startup process execution section 3 sequentially executes the process blocks. For example, the startup process execution section 3 executes the first process block #0, and subsequently executes the next process block #1 upon completing the execution of process block #0. Similarly, the startup process execution section 3 continues the execution until it executes the last process block #4, and ends the execution of the startup process 7 upon completing the execution of the last process block #4.

The abnormality information generation section 4 generates abnormality information 10 when the module 12 is detected to have an abnormality at the time of startup control (the module 12 is detected to have a startup history that is not normal). The abnormality information 10 is information regarding an abnormality that occurred at the time of startup control of the module 12 in which the startup history is not normal. The abnormality information 10 includes information that allows comparison of abnormality level (recovery priority). The abnormality information 10 generated by the abnormality information generation section 4 is retained in the memory 9.

Every time each one of the process blocks of the startup process 7 is executed, the abnormality information generation section 4 may perform the detection of the module 12 in which an abnormality occurs at the time of startup control and the generation of the abnormality information 10.

When the module 12 in which an abnormality occurs at the time of startup control is detected, the reduced operation determination section 5 determines whether or not a reduced operation may be carried out without the module 12 in which an abnormality occurs at the time of startup control. Determining whether or not the reduced operation is possible may be performed by determining whether or not there is the minimum number of the modules 12 having normal startup history for the reduced operation. For example, the minimum number for the reduced operation may be determined from setting values retained in the memory 9 or configuration information that defines the apparatus configuration.

The reduced operation determination section 5 may determine whether or not the reduced operation is possible when the module 12 in which an abnormality occurs at the time of startup control is detected every time each one of the process blocks of the startup process 7 is executed.

The startup process execution section 3 completes the execution of the process block in progress when the reduced operation is possible, and does not complete the execution of the process block in progress when the reduced operation is not possible.

When the reduced operation is not possible, the restart execution section 6 executes a restart process 8 on abnormal modules (selected modules) that are selected based on the abnormality information 10 from among all abnormal modules (the modules 12 in which the startup history is not normal). The selection based on the abnormality information 10 may be performed, for example, by comparing the recovery priorities that may be identified from the abnormality information 10. The recovery priority may be set in a plurality of levels in advance in response to types of detected abnormality. Thus, the restart execution section 6 may be able to set the order of recovery priority by comparing plural pieces of the abnormality information 10 of the abnormal modules. The restart execution section 6 may, for example, select the abnormal module that has the highest recovery priority as the selected module.

Of all the abnormal modules, the restart execution section 6 takes one or more selected modules as execution targets of the restart process 8. Thus, compared to the case where all the abnormal modules are taken as the execution targets, it is expected that there is a higher possibility of completing the execution of the restart process 8 on the selected modules. Furthermore, the restart execution section 6 may take only one selected module. In that case, it is expected that there is even higher possibility of completing the execution of the restart process 8 on the abnormal module that is taken as the execution target.

Thus, the information processing apparatus 1 may reduce the possibility of failure in executing the restart process 8 and reduce the processing time to redo the restart process 8.

Accordingly, even when an abnormality is detected in the redundantly configured modules 12 at the time of startup, the information processing apparatus 1 may reduce a delay time to start up the modules 12.

Second Embodiment

Figure 2:
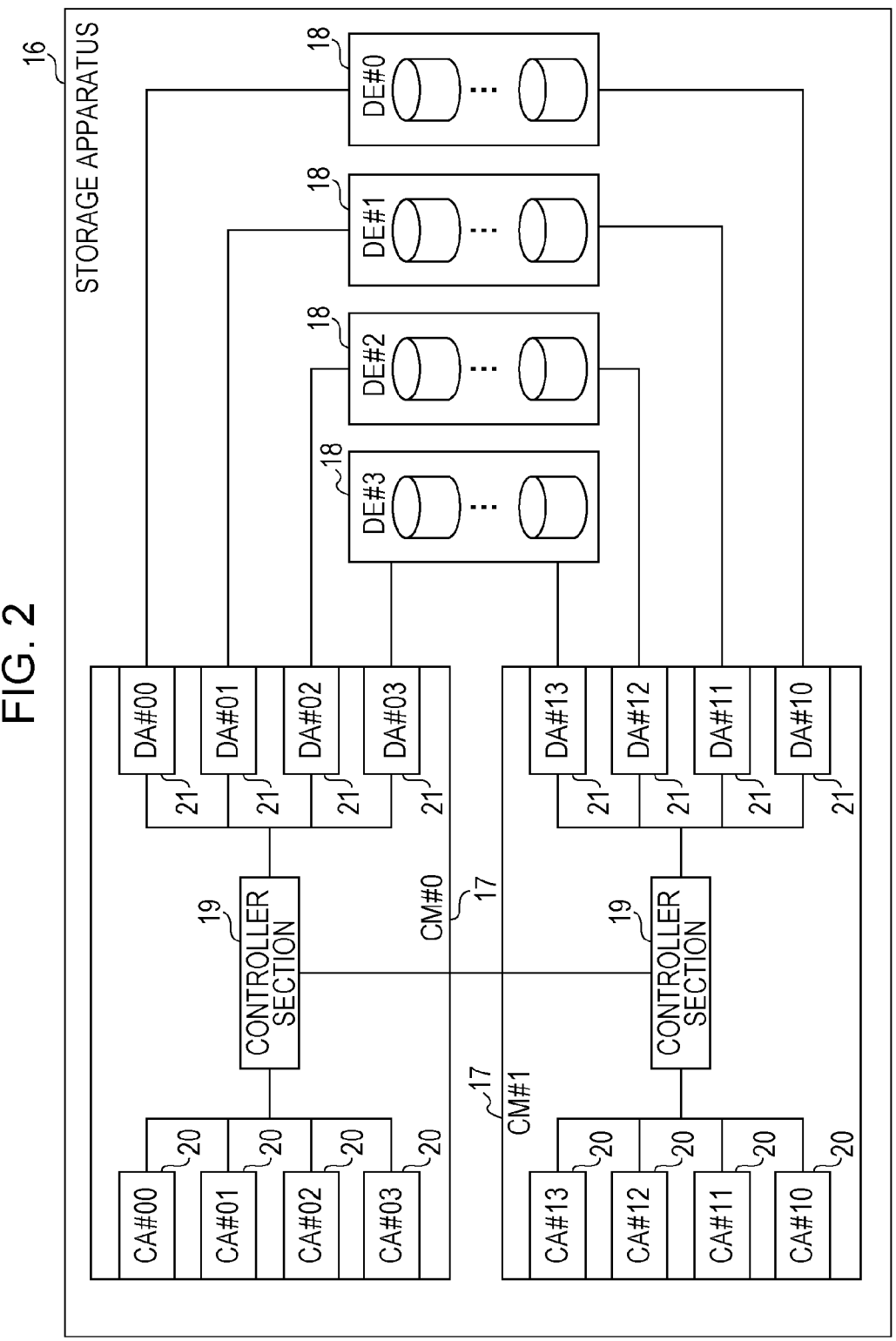
FIG. 2 is a diagram illustrating a configuration example of a storage apparatus according to a second embodiment.

Next, a storage apparatus according to the second embodiment is described with reference to FIG. 2. FIG. 2 is a drawing illustrating a configuration example of the storage apparatus according to the second embodiment.

A storage apparatus 16 is an apparatus that receives access requests (service requests) to storage devices from a server not illustrated in the drawing and responds (service responses) to received requests. The storage apparatus 16 includes management modules (central management (CM) module) 17 and device enclosures (DE) 18.

The storage apparatus 16 includes two management modules 17, CM#0 and CM#1. The management module 17 includes a controller section 19. The controller section 19 carries out an overall control of the storage apparatus 16 and a resource management of the storage apparatus 16. The overall control of the storage apparatus 16 to be carried out by the management modules 17 includes the startup control of the storage apparatus 16.

Of the two management modules 17, CM#0 and CM#1, only CM#0 is a master CM in the storage apparatus 16, and the remaining CM#1 is a slave CM. Here, the storage apparatus 16 includes two management modules 17. Alternatively, the management modules 17 may include three units or more. In that case, one of the management modules 17 becomes the master CM, and the remaining management modules 17 become the slave CMs. Accordingly, the storage apparatus 16 includes redundantly configured management modules 17.

The management modules 17 are connected to each other through their own controller sections 19. Negotiation is performed between the controller sections 19 so as that one of the management modules 17 serves as the master CM. The determination of which one of the management modules 17 becomes the master CM may be performed in accordance with a determination order set in advance, or based on a preset determination rule among the management modules 17 at the time of startup of the storage apparatus 16. When an abnormality occurs in the master CM, one of the remaining slave CMs becomes a new master CM.

The master CM controls the startup process of the storage apparatus 16. The slave CM follows an instruction of the master CM and executes the startup process.

The management module 17 includes channel adaptor modules (CA modules) 20, device adaptor modules (DA modules) 21, and the controller section 19.

The channel adaptor module 20 is an interface module that controls (interface control) a connection with a server not illustrated in the drawing. The management module 17 includes four channel adaptor modules 20. CM#0 includes four channel adaptor modules 20, CA#00, CA#01, CA#02, and CA#03. CM#1 also includes four channel adaptor modules 20, CA#10, CA#11, CA#12, and CA#13. Each channel adaptor module 20 is connected to the controller section 19 of the management module 17 to which this channel adaptor module 20 belongs.

The device adaptor module 21 is an interface module that controls (interface control) a connection with a device enclosure 18. The management module 17 includes four device adaptor modules 21. CM#0 includes four device adaptor modules 21, DA#00, DA#01, DA#02, and DA#03. CM#1 also includes four device adaptor modules 21, DA#10, DA#11, DA#12, and DA#13. Each device adaptor module 21 is connected to the controller section 19 of the management module 17 to which this device adaptor module 21 belongs.

The device enclosure 18 is a storage device assembly including a plurality of storage devices. The storage device (memory apparatus) is capable of storing desirable information, and may be, for example, a hard disk drive (HDD), a solid state drive (SSD) such as flash memory drive, or the like. The storage apparatus 16 includes four device enclosures 18, DE#0, DE#1, DE#2, and DE#3. The device enclosure 18 is connected to a plurality of the management modules 17. DE#0 is connected to DA#00 and DA#10. DE#1 is connected to DA#01 and DA#11. DE#2 is connected to DA#02 and DA#12. DE#3 is connected to DA#03 and DA#13. In the example illustrated in FIG. 2, the device enclosures 18 are included in the storage apparatus 16. However, the device enclosures 18 may be placed outside the storage apparatus 16 and connected thereto externally.

In this way, the storage apparatus 16 is provided with the redundantly configured management modules 17 in an attempt to improve reliability of overall controlling of the storage apparatus 16. Furthermore, each management module 17 is provided with the redundantly configured channel adaptor modules 20 and the redundantly configured device adaptor modules 21 in an attempt to improve reliability of connection with a server and connection with the device enclosure 18.

Figure 3:
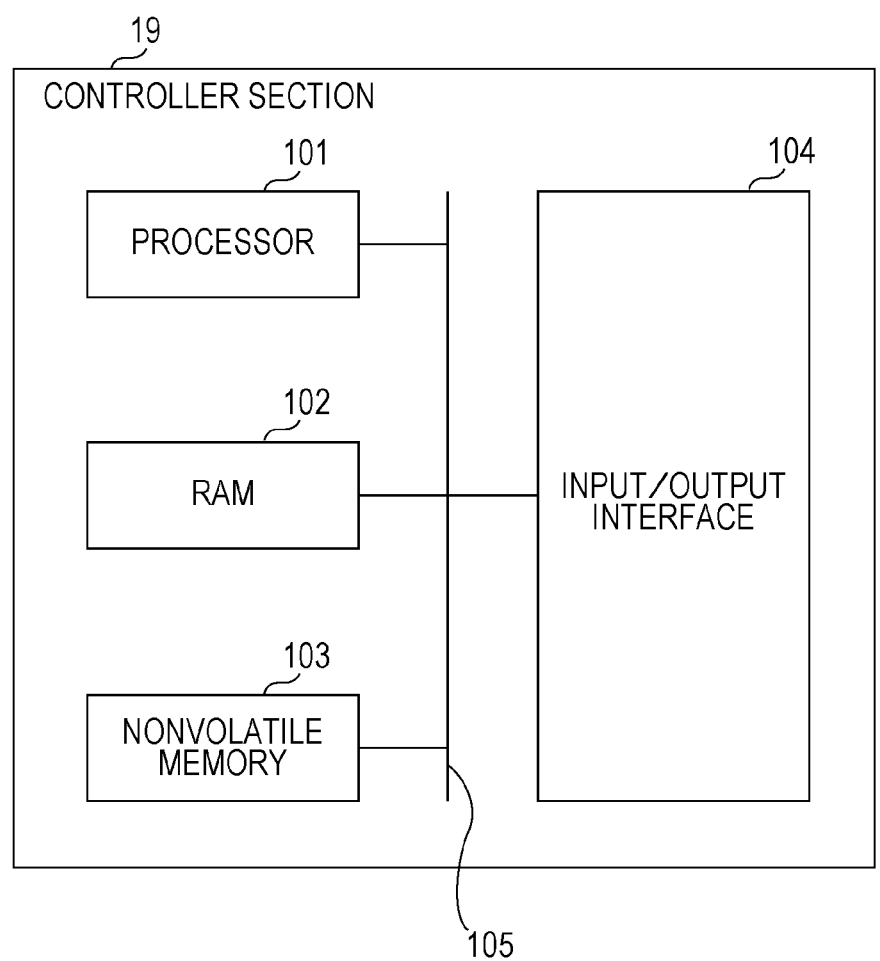
FIG. 3 is a diagram illustrating a hardware configuration example of a controller section of a management module according to the second embodiment.

Next, a hardware configuration of the controller section 19 according to the second embodiment is described with reference to FIG. 3. FIG. 3 is a diagram illustrating a hardware configuration example of the controller section 19 of the management module according to the second embodiment.

A processor 101 controls the entirety of the controller section 19. The processor 101 is connected to a random access memory (RAM) 102 and a plurality of peripheral devices via a bus 105. The processor 101 may be a multiprocessor. The processor 101 may be, for example, a central processing unit (CPU), a micro processing unit (MPU), a digital signal processor (DSP), an application specified integrated circuit (ASIC), or a programmable logic device (PLD). Alternatively, the processor 101 may be a combination of two or more devices selected from a group being comprised of CPU, MPU, DSP, ASIC, and PLD.

The RAM 102 is used as a primary memory device of the controller section 19. The RAM 12 temporarily stores at least part of application programs, firmware, or programs of an operating system (OS) to be executed by the processor 101. The RAM 102 also stores various data to be used for processes (for example, information management for system control or startup control) executed by the processor 101. The RAM 102 may include a cache memory of the storage device.

The peripheral devices connected to the bus 105 include a nonvolatile memory 103 and an input/output interface 104.

The nonvolatile memory 103 retains stored content even at the time of power off of the storage apparatus 16. The nonvolatile memory 103 may be, for example, a semiconductor storage device such as an electrically erasable programmable read-only memory (EEPROM), a flash memory, and the like, or a HDD. Furthermore, the nonvolatile memory 103 is used as an auxiliary storage device of the controller section 19. The nonvolatile memory 103 stores an OS program, firmware, application programs, and various data.

The input/output interface 104 is connected to the channel adaptor modules 20, the device adaptor modules 21, and the controller section 19 that belongs to the other management module 17, and performs input and output operations. The input/output interface 104 receives signals and data from other modules, and transmits them to the processor 101 or the cache memory (RAM 102).

According to the foregoing hardware configuration, process functions of the controller section 19 according to the second embodiment may be actualized. Hardware configurations similar to that of the controller section 19 illustrated in FIG. 3 may actualize the channel adaptor module 20 and the device adaptor module 21 as well as the information processing apparatus 1 according to the first embodiment.

Figure 4:
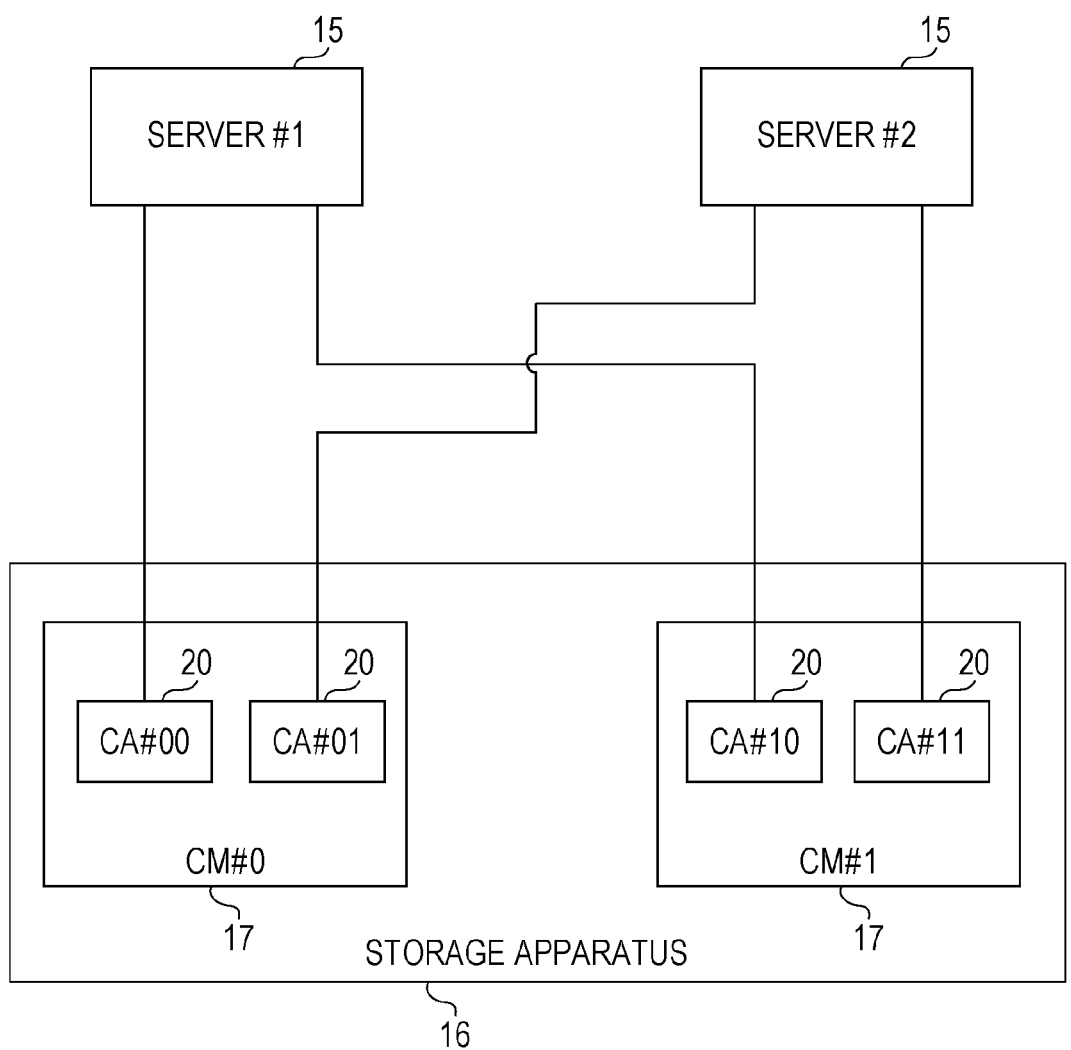
FIG. 4 is a diagram illustrating a redundant configuration example of channel adaptor modules according to the second embodiment.

Next, the redundant configuration of the channel adaptor module according to the second embodiment is described with reference to FIG. 4. FIG. 4 is a diagram illustrating a redundant configuration example of the channel adaptor module according to the second embodiment.

The storage apparatus 16 is connected to two servers 15 (server #1 and server #2) using two channels for each connection. Thus, the storage apparatus 16 and the server 15 are connected through the redundant configuration with which communication may be maintained even when one of the communication channels fails.

Each one of the two management modules 17 of the storage apparatus 16 is connected to the two servers 15, so as that the storage apparatus 16 may be able to communicate with the two servers 15 even when one of the management modules 17 fails. In CM#0, CA#00 is connected the server #1, and CA#01 is connected the server #2. In CM#1, CA#10 is connected the server #1, and CA#11 is connected the server #2.

In this way, the storage apparatus 16 includes the redundantly configured channel adaptor modules 20 by connecting to the server #1 with CA#00 and CA#10 as well as connecting to the server #2 with CA#01 and CA#11.

Next, CA connection destination information according to the second embodiment is described with reference to FIG. 5. FIG. 5 is a diagram illustrating an example of the CA connection destination information according to the second embodiment.

CA connection destination information 50 is connection destination information of each channel adaptor module 20 that belongs to the storage apparatus 16. The CA connection destination information 50 is retained in the nonvolatile memory 103 as setting information that may be set at the time of factory shipping in concert with a user system circumstance. Alternatively, the CA connection destination information 50 may be generated after collecting setting information such as communication address, communication port, and the like, or may be retained in the RAM 102. The CA connection destination information 50 is retained in the master CM.

According to the CA connection destination information 50 illustrated in FIG. 5, CA#00 and CA#10 are connected to the server #1, and CA#01 and CA#11 are connected to the server #2. No device is connected to CA#02, CA#03, CA#12, and CA#13. The master CM may be able to comprehend the redundant configuration of the channel adaptor modules from the CA connection destination information 50.

Next, server group information according to the second embodiment is described with reference to FIG. 6. FIG. 6 is a diagram illustrating an example of the server group information according to the second embodiment.

Server group information 51 represents the channel adaptor modules (CA) that belong to each of the servers 15. The server group information 51 is generated from the CA connection destination information 50. The server group information 51 is retained in the master CM.

In this example, the master CM retains the CA connection destination information 50 and the server group information 51. Alternatively, the master CM may retain only one of the CA connection destination information 50 or the server group information 51 since one may be generated from the other. The slave CM may retain the CA connection destination information 50 and the server group information 51 in synchronization with the master CM.

Here, the redundant configuration of the channel adaptor modules 20, the CA connection destination information 50, and the server group information 51 are described with reference to FIG. 4 to FIG. 6. The device adaptor modules 21 may have a similar redundant configuration as that of the channel adaptor modules 20. In that case, the master CM retains DA connection destination information that indicates the device enclosure 18 connecting to the device adaptor module 21. Furthermore, the master CM retains device enclosure group information that represents the device adaptor modules (DA) that belong to each of the device enclosures 18.

These pieces of information such as the CA connection destination information 50, the server group information 51, the DA connection destination information, the device enclosure group information, and the like, correspond to the configuration information from which configuration relationships among the modules of the storage apparatus 16 may be identified.

Next, a power on sequence according to the second embodiment is described with reference to FIG. 7. FIG. 7 is a diagram illustrating an example of the power on sequence according to the second embodiment.

A power on sequence 52 is a startup process to be performed at the time of power on of the storage apparatus 16. For ease of explanation, only processes targeting the management module 17 and the channel adaptor modules 20 are described, and processes targeting the device adaptor modules 21, which are similar to those of the channel adaptor modules 20, are omitted.

The power on sequence 52 is a table data that defines the process block, the CM process number and the CA process number for each process block, the CM execution process that is process detail for each CM process number, and the CA execution process that is process detail for each CA process number. The power on sequence 52 is retained in the RAM 102.

The power on sequence 52 is divided into a plurality of process units that are referred to as the process blocks. The process blocks have sequential identification numbers, and are sequentially executed (sequential process) in an increasing order of the identification number starting from the initial value "01" to "02", "03" and so on.

The power on sequence 52 is mainly controlled by the master CM. The master CM performs a progress control of each process block of the power on sequence 52.

The process blocks include nine process blocks from "process block 01" to "process block 09". The master CM first starts the execution of "process block 01", and then starts the execution of "process block 02" after completing the execution of "process block 01". When the master CM completes all the execution up to "process block 09" in the way described above, the master CM sets Device-Ready and the storage apparatus 16 is in a state where provision of services is secured.

More specifically, in "process block 01", the master CM executes CM hardware setting that is a process of CM process number "CM01". The CM hardware setting is a process for setting hardware of the management module 17. The master CM executes the process of CM process number "CM01" and instructs the slave CM to execute the process of CM process number "CM01". The master CM ends the process of CM process number "CM01" when the master CM completes the process execution of CM process number "CM01" and receives a report indicating the completion of the process execution of CM process number "CM01" from the slave CM. In "process block 01", the master CM ends the process of "process block 01" since there is no process that follows the process of CM process number "CM01".

The master CM starts the execution of "process block 02" that is the next process following the process of "process block 01" that has ended. "Process block 02" includes processes of CM process numbers "CM02", "CM03" and processes of CA process numbers "CA01", "CA02". The CM process number "CM02" is a process that obtains firmware information. The CM process number "CM03" is a process that checks validity of the firmware information thus obtained. The CA process number "CA01" is a CA power on process that turns on power of the channel adaptor module 20.

The CA process number "CA02" is a CA reset state release process that releases the channel adaptor module 20 from a reset state.

The master CM sequentially executes the processes of CM process numbers "CM02" and "CM03", and instructs the slave CM to sequentially execute the processes of CM process numbers "CM02" and "CM03". The master CM instructs the channel adaptor modules 20 that belong to this master CM to sequentially execute the processes of CA process numbers "CA01" and "CA02". The master CM instructs the slave CM such that the slave CM instructs the channel adaptor modules 20 that belong to this slave CM to sequentially execute the processes of CA process numbers "CA01" and "CA02". The startup process of the management module 17 and the startup process of the channel adaptor module 20 may be executed in parallel.

The master CM ends the processes of CM process numbers "CM02" and "CM03" when the master CM completes the process execution of CM process numbers "CM02" and "CM03" and receives a report indicating the completion of the process execution of CM process numbers "CM02" and "CM03" from the slave CM. The master CM ends the processes of CA process numbers "CA01" and "CA02" when the master CM receives a report indicating the completion of the process execution of CA process numbers "CA01" and "CA02" from each channel adaptor module 20 that belongs to the master CM and a report indicating the completion of the process execution of CA process numbers "CA01" and "CA02" from the slave CM. In "process block 02", the master CM ends the process of "process block 02" since there is no process that follows the processes of CM process numbers "CM02" and "CM03" and the processes of CA process numbers "CA01" and "CA02".

Next, "process block 03" includes a process of CM process number "CM04" and a process of CA process number "CA03". The process of CM process number "CM04" is a CM memory diagnosis that diagnoses the memory (RAM 102) of the management module 17. The process of CA process number "CA03" is a process that performs hardware setting of the channel adaptor module 20.

"Process block 04" includes a process of CM process number "CM05". The process of CM process number "CM05" is Disk-Ready confirmation that checks if the storage device is accessible.

"Process block 05" includes a process of CA process number "CA04". The process of CA process number "CA04" is a process that issues an instruction to start an adaptor process.

"Process block 06" includes a process of CM process number "CM06". The process of CM process number "CM06" is a process that updates the configuration information.

"Process block 07" includes a process of CA process number "CA05". The process of CA process number "CA05" is a process that issues an instruction to receive the configuration information.

"Process block 08" includes a process of CA process number "CA06". The process of CA process number "CA06" is a process that issues an instruction to go online so as to establish a connection with a network and enable communication.

"Process block 09" includes a process of CM process number "CM07". The process of CM process number "CM07" is setting of Device-Ready with which the storage apparatus 16 is ready to provide services.

Furthermore, when the master CM detects a module abnormality in the channel adaptor module 20 in which the execution of the power on sequence is in progress, the master CM determines whether the channel adaptor module 20 in which the abnormality is detected is to be restarted or not. When the master CM decides not to restart the channel adaptor module 20, the master CM restarts the channel adaptor module 20 later after setting the storage apparatus 16 to Device-Ready. When the master CM decides to restart the channel adaptor module 20, the master CM interrupts processing of the process block and restarts the channel adaptor module 20.

Next, a CA restart process according to the second embodiment is described with reference to FIG. 8. FIG. 8 is a diagram illustrating an example of the CA restart process according to the second embodiment.

A CA restart process sequence 53 is a restart process of the channel adaptor module 20 in which an abnormality is detected. Below, the CA restart process sequence 53 is described as an example of a restart process of module. Similar restart processes may be employed for other modules, and thus descriptions thereof are omitted.

The CA restart process sequence 53 is a table data that defines the process block, the CA process number for each process block, and the CA execution process that is process detail for each CA process number. The CA restart process sequence 53 is retained in the RAM 102. As is the case with the power on sequence 52, the CA restart process sequence 53 is divided into a plurality of process units that is referred to as the process blocks.

The CA restart process sequence 53 is mainly controlled by the master CM. The master CM performs a progress control of each process block of the CA restart process sequence 53.

The process blocks include five process blocks from "process block 01" to "process block 05". The master CM first executes "process block 01", and then executes "process block 02" after completing the execution of "process block 01". In this way, by completing such executions up to "process block 05", the master CM checks whether or not the channel adaptor module 20 in which an abnormality is detected is restarted properly.

More specifically, in "process block 01", the master CM instructs the channel adaptor module 20 in which an abnormality is detected to sequentially execute processes of CA process numbers "CAR01", "CAR02", and "CAR03". When the channel adaptor module 20 in which an abnormality is detected belongs to the slave CM, the master CM instructs the slave CM that controls the channel adaptor module 20 in which an abnormality is detected.

CA process number "CAR01" is a process that resets the channel adaptor module 20. CA process number "CAR02" is a process that turns off power of the channel adaptor module 20 and turns on the power after the power off. CA process number "CAR03" is a process that releases the channel adaptor module 20 from a reset state.

In "process block 01", the master CM ends the process of "process block 01" since there is no process that follows the process of CA process number "CAR03".

The master CM executes "process block 02" that is the next process following the process of "process block 01" that has ended. "Process block 02" includes a process of CA process number "CAR04". The CA process number "CAR04" is a process that performs hardware setting of the channel adaptor module 20.

"Process block 03" includes a process of CA process number "CAR05". The process of CA process number "CAR05" is a process that issues an instruction to start an adaptor process.

"Process block 04" includes a process of CA process number "CAR06". The process of CA process number "CAR06" is a process that issues an instruction to receive the configuration information.

"Process block 05" includes a process of CA process number "CAR07". The process of CA process number "CAR07" is a process that issues an instruction to go online so as to establish a connection with a network and enable communication.

Upon completing the restart of the channel adaptor module 20, the master CM is allowed to confirm the proper restart of the channel adaptor module 20.

Figure 9:
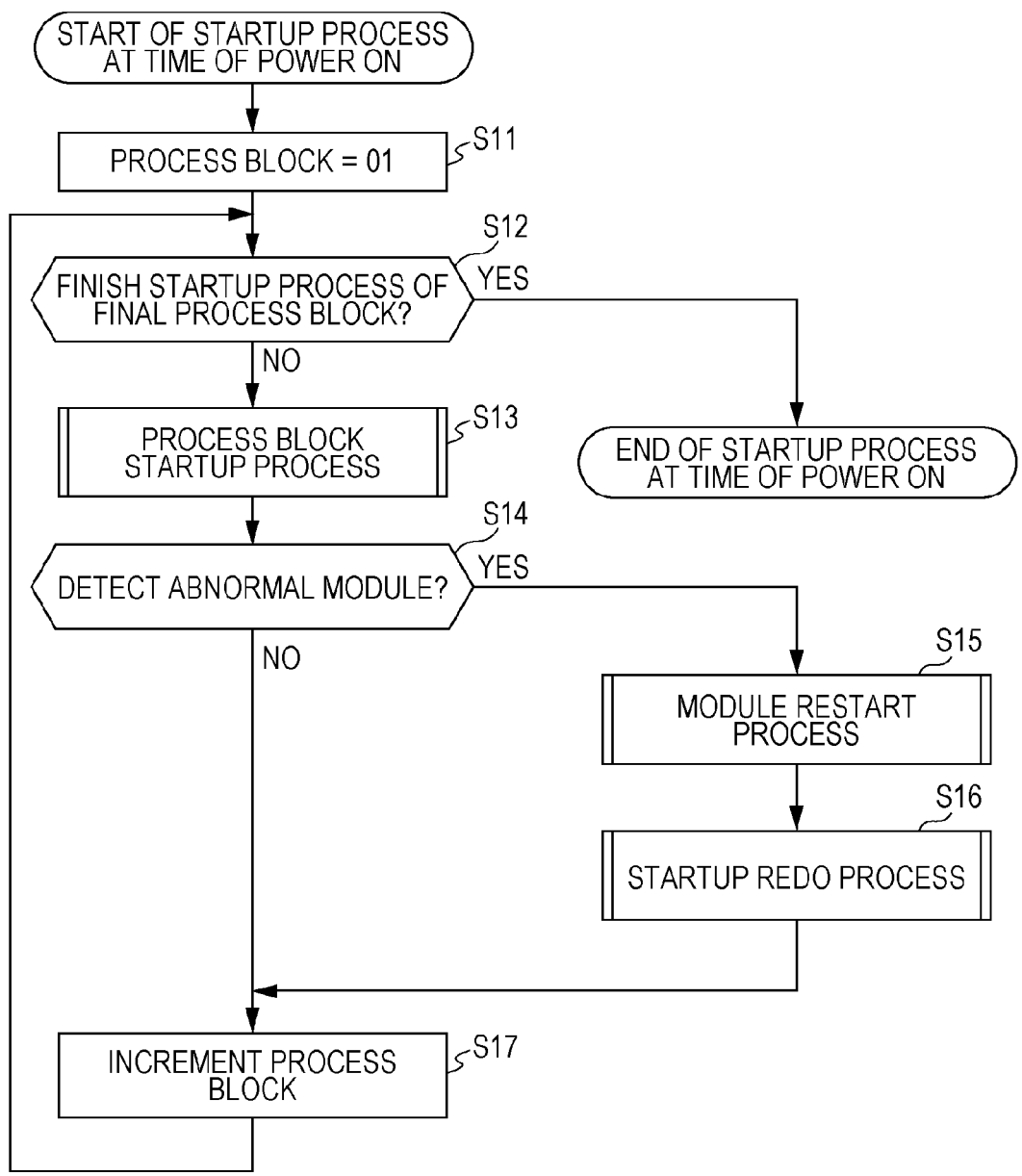
FIG. 9 is a flowchart of a startup process at time of power on according to the second embodiment.

Next, a startup process at the time of power on to be performed by the controller section 19 of the master CM according to the second embodiment is described with reference to FIG. 9. FIG. 9 is a flowchart of the startup process at the time of power on according to the second embodiment.

The startup process at the time of power on is a process that controls the startup of the storage apparatus 16. The startup process at the time of power on is executed by the controller section 19 of the master CM when turning power on or resetting.

Operation S11: The controller section 19 of the master CM initializes the process block that is a process target of the power on sequence 52 to "01".

Operation S12: The controller section 19 of the master CM determines whether or not the startup process of the last process block ("process block 09") of the power on sequence 52 is ended (completed). When the startup process of the last process block of the power on sequence 52 is ended, the startup process at the time of power on ends. When the startup process is not ended yet, the process proceeds to Operation S13.

Operation S13: The controller section 19 of the master CM executes a process block startup process. The process block startup process is a process that executes the process of the process block that is the current process target of the power on sequence 52. When there is the CM execution process, the master CM executes the CM execution process and instructs the slave CM to execute the CM execution process. When there is the CA execution process, the master CM instructs the channel adaptor module 20 that belongs to the master CM and the slave CM to execute the CA execution process. The slave CM executes the CM execution process when it is instructed to execute the CM execution process, and returns a completion response to the master CM after completing the execution of the CM execution process. When the slave CM is instructed to execute the CA execution process, the slave CM instructs the channel adaptor module 20 that belongs to this slave CM to execute the CA execution process. Upon receiving a completion response from the channel adaptor module 20, the slave CM returns a completion response to the master CM. The controller section 19 of the master CM confirms the completion of the execution of the process block that is the current process target of the power on sequence 52, and ends the process block startup process. The completion response includes information that allows determining whether the process is completed properly or the process is not completed due to occurrence of an abnormality. The completion response includes non-response where no response is received within a predetermined time period.

Operation S14: The controller section 19 of the master CM determines the presence or absence of abnormal module detection during the execution of the process block that is the current process target of the power on sequence 52. The controller section 19 of the master CM may determine the presence or absence of abnormal module detection from its own process result or the completion response. The process proceeds to Operation S15 when the controller section 19 of the master CM detects the abnormal module, and proceeds to Operation S17 when no abnormal module is detected.

Operation S15: The controller section 19 of the master CM executes a module restart process. The module restart process is a process that selects a target module to be restarted from among the modules in which abnormalities are detected and that restarts the target module thus selected. The module restart process is described below in detail with reference to FIG. 10.

Operation S16: The controller section 19 of the master CM executes a startup redo process. The startup redo process is a process that redoes the power on sequence 52 on the module (restarted module) that starts properly from among the modules to which the restart process is executed. The controller section 19 of the master CM re-executes processes of "process block 01" up to the process block currently in progress of the power on sequence 52 on the restart module.

Operation S17: The controller section 19 of the master CM increments the value of the process block by one, and the process proceeds to Operation S12.

In this way, the storage apparatus 16 executes the startup process at the time of power on. Here, the restart process and the startup redo process are executed on the selected one of the modules in which abnormalities are detected in an attempt to improve the possibility of early recovery.

Figure 10:
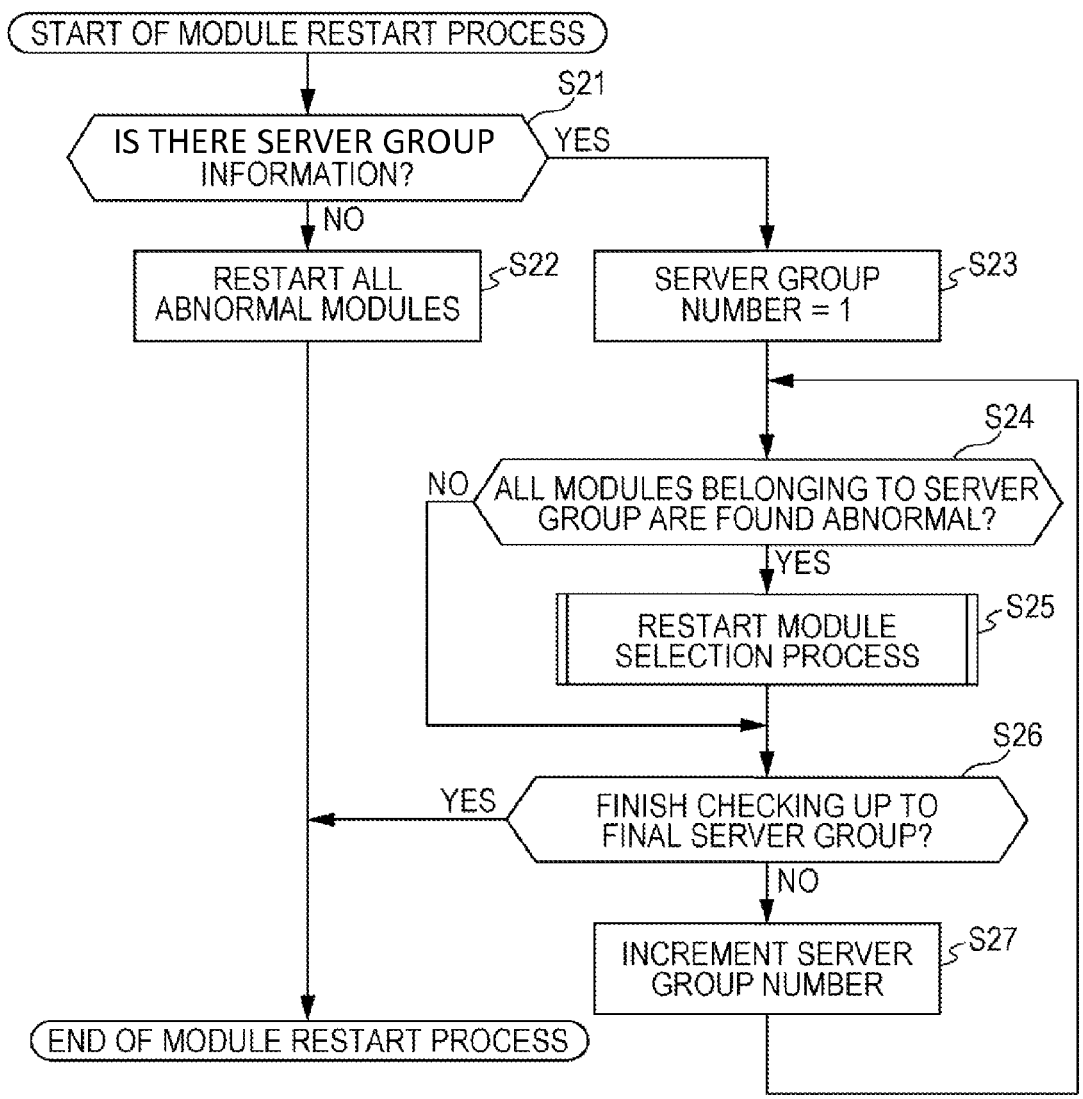
FIG. 10 is a flowchart of a module restart process according to the second embodiment.

Next, the module restart process to be executed by the controller section 19 of the master CM according to the second embodiment is described with reference to FIG. 10. FIG. 10 is a flowchart of the module restart process according to the second embodiment.

The module restart process is a process that selects a target module to be restarted from among the modules in which abnormalities are detected and restarts the target module thus selected. The module restart process is executed by the controller section 19 of the master CM in Operation S15 of the startup process at the time of power on.

Operation S21: The controller section 19 of the master CM determines whether or not the server group information 51 is retained. The process proceeds to Operation S23 when the controller section 19 of the master CM retains the server group information 51, and proceeds to Operation S22 when no server group information 51 is retained. It may suffice that the controller section 19 of the master CM retains configuration information that allows identifying the redundant configuration of the modules of the storage apparatus 16. The configuration information other than the server group information 51 may be used as a substitute for the determination.

Operation S22: Here, the controller section 19 of the master CM may not be able to identify the redundant configuration of the modules. Thus, all the abnormal modules are restarted, and then the module restart process ends. In this example, the abnormal module is the channel adaptor module 20. Thus, the restart of the abnormal module is performed according to the CA restart process sequence 53.

Operation S23: The controller section 19 of the master CM initializes the number of server group to "1".

Operation S24: The controller section 19 of the master CM determines whether or not the abnormality of all the channel adaptor modules 20 that belong to the server group is detected. The process proceeds to Operation S25 when the controller section 19 of the master CM detects the abnormality of all the channel adaptor modules 20, and proceeds to Operation S26 when the abnormality is not yet detected in any one of the channel adaptor modules 20.

Here, a restart module selection process is not executed when the abnormality is not detected in any one of the channel adaptor modules 20. This is because the minimum number of operating units is one for the channel adaptor modules 20 in each server group. In other words, in Operation S24, the module restart process determines whether or not the minimum number of operating units may be secured for the channel adaptor modules 20 in each server group. Thus, in Operation S24, the module restart process may alternatively perform the determination in response to the minimum number of operating units (for example, two units) for the channel adaptor modules 20 in each server group.

Operation S25: The controller section 19 of the master CM executes the restart module selection process. The restart module selection process is a process that selects a target module to be restarted by comparing the recovery priorities of the modules in which the abnormality is detected, and restarts the target module thus selected. Details of the restart module selection process is described below with reference to FIG. 11.

Operation S26: The controller section 19 of the master CM determines whether or not the channel adaptor modules 20 are checked to the final server group to see if the minimum number of operating units is secured. The process proceeds to Operation S27 when the controller section 19 of the master CM has not checked the channel adaptor modules 20 to the final server group to see if the minimum number of operating units is secured. The module restart process ends when the checking completes to the final server group.

Operation S27: The controller section 19 of the master CM increments the number of server group by one, and the process proceeds to Operation S24.

Figure 11:
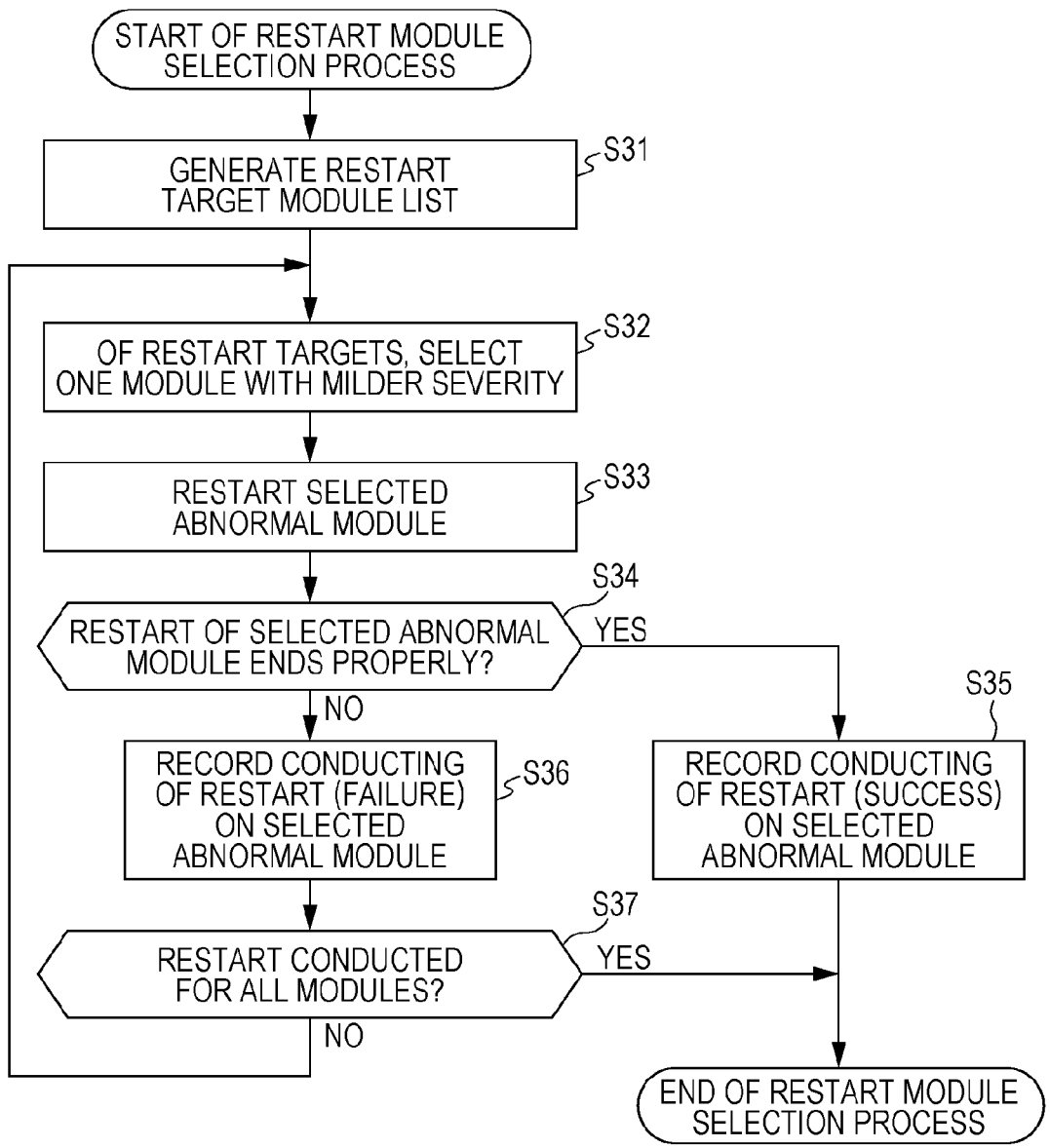
FIG. 11 is a flowchart of a restart module selection process according to the second embodiment.

Next, the restart module selection process to be executed by the controller section 19 of the master CM according to the second embodiment is described with reference to FIG. 11. FIG. 11 is a flowchart of the restart module selection process according to the second embodiment.

The restart module selection process is a process that selects a target module to be restarted by comparing the recovery priorities of the modules in which abnormalities are detected, and restarts the target module thus selected. The restart module selection process is executed by the controller section 19 of the master CM in Operation S25 of the module restart process.

Operation S31: The controller section 19 of the master CM generates abnormality configuration information that is a list designating the modules (abnormal modules) in which abnormalities are detected as the restart target.

The abnormality configuration information is now described with reference to FIG. 12. FIG. 12 is a diagram illustrating an example of the abnormality configuration information according to the second embodiment. Abnormality configuration information 55 is information regarding the abnormality of each module in which the abnormality is detected, and includes location information, status (state), cause of error, severity, possibility of recovery, and point.

The location information is information that allows identification of the module in which an abnormality is detected and a module to which the module in which an abnormality is detected belongs. For example, the location information "CM#0, CA#00" indicates that an abnormality is detected at the channel adaptor module 20 (CA#00) that belongs to the management module 17 (CM#0).

The status (state) is information that indicates a state of a target module of abnormality detection. For example, the status "Degrade" indicates that the target module of abnormality detection is in an abnormal state.

The cause of error is information that indicates a cause of abnormality. The information indicating a cause of abnormality may be, for example, "hardware error", "software error", "fatal hardware error", and the like. The cause of error may alternatively be information that allows identifying a type of error (abnormality) such as, for example, an error code or the like.

The severity is information that allows making a relative comparison of the abnormality level. For example, the severity may be "mild", "moderate", or "severe". "Mild" corresponds to a low abnormality level, "severe" corresponds to a high abnormality level, and "moderate" corresponds to an intermediate abnormality level between "mild" and "severe". Thus, when a recovery order of modules is determined in response to the severity, the severity corresponds to the recovery priority. The recovery priority may be any information that may be used to determine the recovery order, and may also include the possibility of recovery in addition to the severity.

The severity may be information that is uniquely determined in accordance with the cause of error, or information that is determined in accordance with circumstances at the time of abnormality detection such as a location, timing, and the like.

The possibility of recovery is information that indicates possibility of error recovery. For example, the possibility of recovery may be "recoverable" indicating that there is a possibility of error recovery or "non-recoverable" indicating that there is no possibility of error recovery.

For example, in the case corresponding to the abnormality configuration information 55, the master CM gives priority to the recovery of CA#01 that has a higher recovery priority (mild severity), and makes an attempt to recover CA#00 when the master CM failed to recover CA#01. CA#10 is not a recovery target since its possibility of recovery is "non-recoverable".

The point is information that indicates the process number that detects an error. The point "CA04" indicates that an error is detected during the process of CA process number "CA04" in "process block 05" of the power on sequence 52.

Operation S32: The controller section 19 of the master CM selects one module with a milder severity from among the target modules to be restarted. The severity corresponds to the abnormality level. The controller section 19 of the master CM compares the severities of the target modules to be restarted and selects one module having the mildest severity. The degree of severity is set in advance for each kind of abnormality so as to correlate with a level of the possibility of recovery that is empirically acquired. Thus, the comparison of the severity among the target modules to be restarted corresponds to the comparison of the possibility of recovery.

Operation S33: The controller section 19 of the master CM restarts the abnormal module thus selected. Here, the abnormal module is the channel adaptor module 20. Thus, the restart of the abnormal module is performed according to the CA restart process sequence 53.

Operation S34: The controller section 19 of the master CM determines whether or not the restart of the abnormal module ends properly. The process proceeds to Operation S35 when the controller section 19 of the master CM determines that the restart of the abnormal module ends properly, and proceeds to Operation S36 when the restart of the abnormal module does not end properly.

Operation S35: The controller section 19 of the master CM records the proper ending of restart of the abnormal module in a working area of the RAM 102 and ends the restart module selection process. The module in which the restart ends properly may be identified from records of the working area, and becomes a process target of the startup redo process in Operation S16 of the startup process at the time of power on.

Operation S36: The controller section 19 of the master CM records the restart failure of the abnormal module in a working area of the RAM 102.

Operation S37: The controller section 19 of the master CM determines whether or not the restart is tried for all the abnormal modules listed in the abnormality configuration information. The process proceeds to Operation S32 when the controller section 19 of the master CM determines that the restart is not tried for all the abnormal modules. The restart module selection process ends when the restart is tried for all the abnormal modules. A non-recoverable abnormal module with a fatal abnormality may be excluded from the target modules to be restarted in advance.

In this way, the controller section 19 of the master CM selects the abnormal module with a higher possibility of recovery from among the modules in which abnormalities are detected, and restarts the target module thus selected. Thus, the storage apparatus 16 may reduce a delay in the startup process by repeatedly detecting the abnormality by restarting the module with a less possibility of recovery.

Accordingly, the storage apparatus 16 may execute the startup process at the time of power on with high probability of ending the startup process on time. The storage apparatus 16 did not restart some of the abnormal modules before ending the startup process at the time of power on. The controller section 19 of the master CM makes an attempt to recover the redundant configuration in the state where provision of services is secured by restarting those un-restarted abnormal modules after ending the startup process at the time of power on, namely when the storage apparatus 16 becomes Device-Ready.

Next, a first abnormality detection example for the redundantly configured channel adaptor modules 20 during the startup process at the time of power on is described with reference to FIG. 13 and FIG. 14. This startup process at the time of power on is executed by the controller section 19 of the master CM according to the second embodiment. FIG. 13 is a diagram illustrating an abnormality detection example at one of the redundantly configured channel adaptor modules during the power on sequence according to the second embodiment.

The first abnormality detection example is a case where a startup failure (abnormality) of CA#00, which is one of the redundantly configured channel adaptor modules 20, is detected during the process of CA process number "CA04" in "process block 05" of the power on sequence 52.

FIG. 14 illustrates the abnormality configuration information generated in that case. FIG. 14 is a diagram illustrating an example of the abnormality configuration information at the time of abnormality detection illustrated in FIG. 13.

According to the abnormality configuration information 56, an error of CA#00 has the severity of "moderate" and is recoverable. According to the server group information 51, CA#00 is one of the redundantly configured channel adaptor modules 20. Thus, it is apparent that the reduced operation may be possible with operating CA#10 and non-operating CA#00. Accordingly, the master CM continues the startup process of the storage apparatus 16 without recovering (CA restart process) CA#00 even when an abnormality is detected in CA#00. The master CM recovers CA#00 after setting the storage apparatus 16 to Device-Ready. Thus, in the storage apparatus 16, the startup process may not be delayed by the abnormality detection of CA#00.

Next, a second abnormality detection example for the redundantly configured channel adaptor modules 20 during the startup process at the time of power on is described with reference to FIG. 15 to FIG. 17. This startup process at the time of power on is also executed by the controller section 19 of the master CM according to the second embodiment. FIG. 15 is a diagram illustrating an abnormality detection example of all the redundantly configured channel adaptor modules during the power on sequence according to the second embodiment.

The second abnormality detection example is a case where a startup failure (abnormality) is detected in a plurality of the channel adaptor modules 20 during the power on sequence 52. In the second abnormality detection example, an startup failure (first startup failure) of CA#10 is detected during the process of CA process number "CA02" in "process block 02", and an startup failure (second startup failure) of CA#00 is detected during the process of CA process number "CA04" in "process block 05".

FIG. 16 illustrates the abnormality configuration information generated at the time of the first startup failure. FIG. 16 is a diagram illustrating an example of the abnormality configuration information at the time of abnormality detection illustrated in FIG. 15. According to the abnormality configuration information 58, an error of CA#10 has the severity of "moderate" and is recoverable. According to the server group information 51, CA#10 is one of the redundantly configured channel adaptor modules 20. Thus, it is apparent that the reduced operation may be possible with operating CA#00 and non-operating CA#10. Accordingly, the master CM continues the startup process of the storage apparatus 16 without recovering (CA restart process) CA#10 even when an abnormality is detected in CA#10.

Next, FIG. 17 illustrates the abnormality configuration information generated at the time of the second startup failure. FIG. 17 is a diagram illustrating an example of the abnormality configuration information at the time of abnormality detection illustrated in FIG. 15. According to the abnormality configuration information 59, an error of CA#00 has the severity of "severe" and is non-recoverable. Both CA#00 and CA#10 are members of the redundantly configured channel adaptor modules 20, and the abnormality is already detected in CA#10. Thus, it is apparent that the reduced operation of the storage apparatus 16 may not be possible when CA#00 is not operable.

Accordingly, upon detecting the abnormality in both CA#00 and CA#10, the master CM makes an attempt to recover (CA restart process) either CA#00 or CA#10 to enable the reduced operation of the storage apparatus 16 to be carried out. Here, the master CM compares the severity of "severe" in CA#00 and the severity of "moderate" in CA#10, and chooses CA#10 as the recovery target and does not choose CA#00 as the recovery target since CA#10 has a less severe severity and a higher possibility of recovery. Alternatively, the master CM may excludes CA#00 from the recovery targets when CA#00 is found to be "non-recoverable" in term of the possibility of recovery.

The master CM executes the CA restart process on CA#10 that serves as the recovery target. Subsequently, when the proper restart of CA#10 is confirmed, the master CM executes the startup redo process in the startup process at the time of power on, and continues the startup process of the storage apparatus 16.

Thus, in the storage apparatus 16, the startup process may not be delayed when there is only the first startup failure. Furthermore, in the storage apparatus 16, the startup process may not be delayed even when the second startup failure disables the reduced operation of the storage apparatus 16. This is because the restart of the module with a higher possibility of recovery receives a higher priority, and thus a failure in restarting the module with a lower possibility of recovery may not delay the startup process.

Hereinbefore, the storage apparatus 16 is used as the example. However, the same applies to other type of information processing apparatus. The foregoing process functions may be implemented by a computer. In that case, programs in which details of processes of functions to be performed by the information processing apparatus 1 and the storage apparatus 16 (controller section 19) are provided. Executing those programs with the computer allows implementing the foregoing process functions on the computer. The programs that describe details of processes may be recorded in a computer-readable recording medium. The computer-readable recording medium may be a magnetic memory device, an optical disc, a magneto-optical recording medium, a semiconductor memory, or the like. The magnetic memory device may be a hard disk drive (HDD), a flexible disk (FD), a magnetic tape, or the like. The optical disc may be a DVD, a DVD-RAM, a CD-ROM/RW, or the like. The magneto-optical recording medium may be a magneto-optical disc (MO) or the like.

When marketing programs, for example, portable recording media such as DVDs, CD-ROMs, and the like, in which the programs are recorded, may be offered for sale. Alternatively, the program may be stored in a memory device of a server computer and transferred to other computer from that server computer through a network.

A computer that executes the program receives the program recorded in the portable recording medium or the program transferred from the server computer, and stores the program thus received in its own memory device. The computer reads the program from its own memory device, and executes a process according to the program. Alternatively, the computer may read the program directly from the portable recording medium, and executes a process according to that program. Furthermore, the computer may also execute a process according to a received program every time the computer receives a program transferred from the server computer through a network.

Furthermore, at least part of the foregoing process functions may alternatively be actualized by an electronic circuit such as DSP, ASIC, PLD, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus that performs a startup control of redundantly configured modules, comprising:
    a memory configured to retain abnormality information regarding an abnormality that occurs at a time of startup control of the redundantly configured modules; and
    a startup controller section configured to
    execute a startup process including plural process blocks by sequentially executing the plural process blocks,
    generate the abnormality information, and determine whether or not a reduced operation is possible without a module in which an abnormality occurs at the time of startup control when the module in which an abnormality occurs at the time of startup control is detected,
    complete an execution of a process block in progress when it is determined that the reduced operation is possible, and
    execute a restart process on a module selected from all the modules in which abnormalities occur at the time of startup control based on the abnormality information, and complete an execution of the process block in progress after completing the restart process when it is determined that the reduced operation is not possible.

2. The information processing apparatus according to claim 1, wherein
    the startup controller section executes the restart process on a module selected from all the modules in which abnormalities occur at the time of startup control by comparing recovery priorities that are identifiable from the abnormality information.

3. The information processing apparatus according to claim 2, wherein
    the startup controller section selects a module with a higher recovery priority.

4. The information processing apparatus according to claim 3, wherein
    the startup controller section selects one module from among all the modules in which abnormalities occur at the time of startup control, and executes the restart process on the one module thus selected.

5. The information processing apparatus according to claim 4, wherein
    the startup controller section re-executes the startup process on a module, on which the restart process completes properly, up to the process block in progress.

6. The information processing apparatus according to claim 1, wherein
    the memory retains configuration information that allows identification of a redundant configuration of the modules, and
    the startup controller section determines whether or not a reduced operation is possible without a module in which an abnormality occurs at the time of startup control based on the configuration information.

7. The information processing apparatus according to claim 1, wherein
    the startup controller section executes the restart process on a first module after ending the startup process, the first module being one of the modules in which abnormalities occur at the time of startup control and on which the restart process is not executed during the startup process.

8. The information processing apparatus according to claim 1, wherein the selected module has a processor.

9. A computer-readable recording medium having stored therein a program for causing a computer to execute a startup control of redundantly configured modules comprising:
    executing a startup process including plural process blocks by sequentially executing the plural process blocks;
    generating abnormality information regarding abnormalities, and determining whether or not a reduced operation is possible without a module in which an abnormality occurs at a time of startup control when the module in which the abnormality occurs at the time of startup control is detected;
    completing an execution of a process block in progress when it is determined that the reduced operation is possible; and
    executing a restart process on a module selected from among all the modules in which abnormalities occur at the time of startup control based on the abnormality information, and completing an execution of the process block in progress after completing the restart process when it is determined that the reduced operation is not possible.

10. A method for performing a startup control of redundantly configured modules, the method causing a computer to perform a process comprising:

executing a startup process including plural process blocks by sequentially executing the plural process blocks;

generating abnormality information regarding abnormalities, and determining whether or not a reduced operation is possible without a module in which an abnormality occurs at a time of startup control when the module in which the abnormality occurs at the time of startup control is detected;

completing an execution of the process block in progress when it is determined that the reduced operation is possible; and executing a restart process on a module selected from all the modules in which abnormalities occur at the time of startup control based on the abnormality information, and completing an execution of the process block in progress after ending the restart process when it is determined that the reduced operation is not possible.

* * * * *